Jan. 8, 1924.

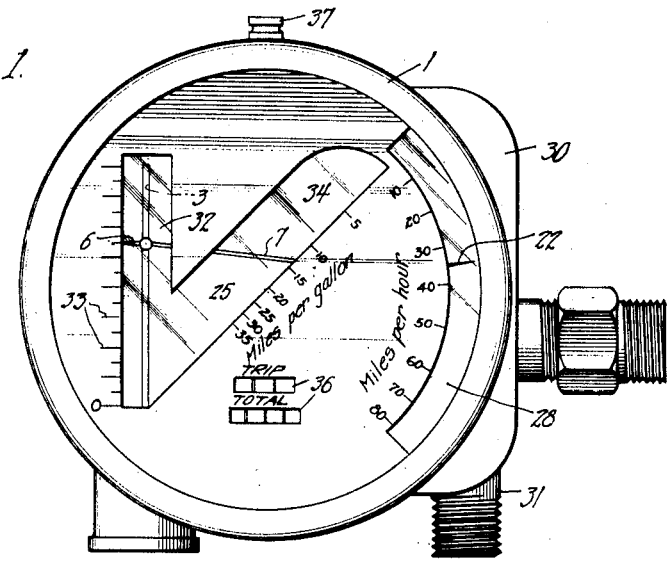
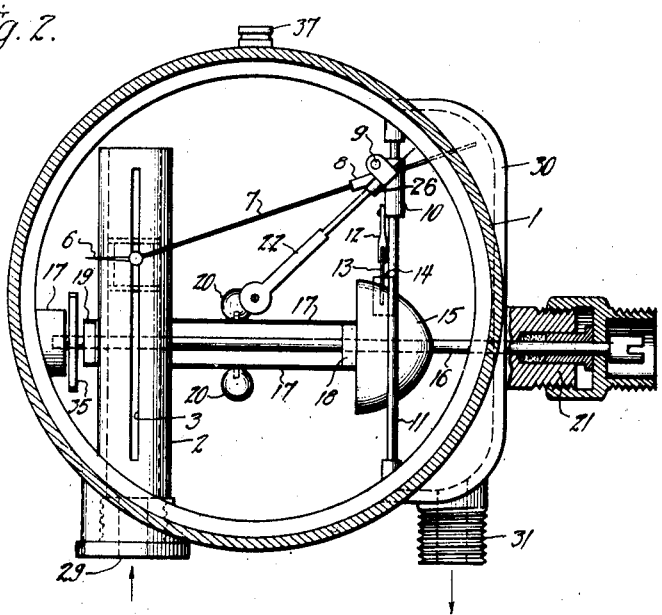

R. W. SCHROEDER

FLOW METER

Filed Feb. 16, 1921

Inventor.
Rudolph W. Schroeder
By Nissen & Crane Atty.

Patented Jan. 8, 1924.

1,479,873

UNITED STATES PATENT OFFICE.

RUDOLPH W. SCHROEDER, OF CHICAGO, ILLINOIS.

FLOW METER.

Application filed February 16, 1921. Serial No. 445,504.

*To all whom it may concern:*

Be it known that I, RUDOLPH W. SCHROE-DER, a citizen of the United States, residing at Chicago, in the county of Cook and State of Illinois, have invented certain new and useful Improvements in Flow Meters, of which the following is a specification.

This invention relates to meters for indicating a quantity, one factor of which is the rate of flow of a fluid, and is especially applicable to measuring the rate of flow of the fuel to an internal combustion engine, such as an automobile engine, in its relation to the speed of the vehicle driven by the engine.

In the particular embodiment of the invention shown in the drawings, the instrument is designed to indicate directly at any particular time the miles per gallon of fuel consumed. One object of the invention therefore is to provide an instrument which will indicate directly mileage per unit of motor fuel consumed. The instrument may, of course, be applied to motors for driving loads other than motor vehicles, and in general will indicate the amount of work being done per unit fuel consumed.

The invention also has for its object the provision of a measuring instrument of the class named which shall be of improved construction and operation.

The invention is exemplified in the combination and arrangement of parts shown in the accompanying drawings and described in the following specification, and it is more particularly pointed out in the appended claims.

In the drawings—

Fig. 1 is a front elevation of one form of instrument embodying the present invention;

Fig. 2 is a view similar to Fig. 1 with the dial plate removed to expose the working parts;

Figure 3:
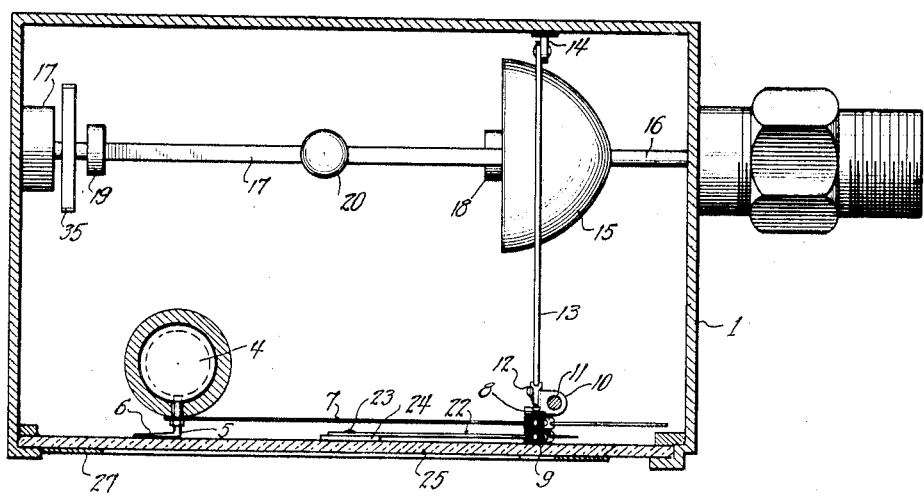
Figure 4:
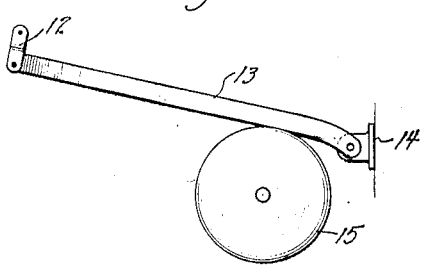

Fig. 3 is a top plan view with the enclosing casing in section to show the internal construction; and Fig. 4 is a fragmentary detail.

The numeral 1 designates an enclosing casing which is air and liquid tight, and secured within the casing 1 is a tube or standpipe 2 open at its upper end and having a vertical slot 3 in the front portion of the wall of the tube. A plunger 4 is arranged within the bore of the tube 2 so that it moves freely up and down within the tube and preferably is provided with sufficient clearance to permit very slight leakage of fluid past the plunger and to insure free movement of the plunger in the tube. A pin 5 is carried by the plunger 4 and projects through the slot 3 and at its outer end carries a laterally extending pointer 6. A light rod 7, such as an aluminum wire, has one end pivotally mounted on the pin 5. The other end of the rod 7 is slidably mounted in a sleeve 8, the sleeve being pivoted on a pin 9 secured to a collar 10 mounted to slide vertically upon a rod 11 arranged within the casing 1. The collar 10 has a link 12 pivoted thereon, the lower end of the link being pivoted to an arm 13, and the opposite end of the arm 13 being pivotally mounted upon a lug 14 secured to the rear wall of the casing 1. The arm 13 rests upon a cone disc 15 slidably mounted on a shaft 16 journaled in a bearing 17 and secured to the inner face of the casing 1. The cone disc 15 is caused to rotate with the shaft 16 by leaf springs 17 connected with a boss 18 on the cone 15 and having their opposite ends fixed to the shaft 16 by a disc 19 to which the springs are secured. Weights 20 are carried by the springs 17 and move outwardly by centrifugal force as the shaft 16 is rotated, thus sliding the cone 15 along the shaft 16 in a manner well known in speedometer construction. It is apparent that the movement of the cone 15 along the shaft 16 will cause the collar 10 to move down along the rod 11 as the speed of the shaft 16 increases. The shaft 16 is carried outwardly through the wall of the casing 1 and is packed by means of a stuffing box 21 to permit escape of fluid from the interior of the casing. The shaft 16 may be connected with the wheel of a motor vehicle in the manner commonly employed in speedometer construction.

An indicator 22 is pivoted at 23 on a supporting block 24 secured to the inner face of the front glass 25 of the instrument. The outer end of the indicator 22 passes through a sleeve 26 pivotally carried by the pin 9 on the collar 10. A dial 27 is secured to the outer face of the cover glass 25 and has a portion of the outer periphery cut away to provide a slot 28. Graduations are provided adjacent the inner edge of the slot 28, the graduations being calibrated to indicated miles per hour. The end of the indicator 22 is visible through the slot 28, and since the movement of the indicator is controlled by the speed of the vehicle, it is apparent that the speed of the vehicle may be indicated by the position of the protruding point of the indicator 22 in the rear of the graduated scale.

The tube or standpipe 2 is provided with an inlet 29 at its lower end which is connected with the fuel supply tank for the motor. An extension 30 is provided on the casing 1 to permit movement of the end of the rod 7 as the collar 10 travels up, and down on the standard 11, and an outlet connection 31 communicates with the interior of the casing 1 to the bottom of the projection 30 and is connected through the carbureter to the intake manifold of the engine.

The operation of the engine will tend to reduce the pressure in the casing 1 as it draws fuel through the carbureter and the fuel from the supply tank will rush in through the intake 29 and raise the piston 4 so that it may escape through the slot 3 into the interior of the casing 1. The piston 4 will assume a position in the standpipe 2 depending upon the rate of flow of fluid through the slot 3. It is thus apparent that the slotted tube 2 with its piston 4 constitutes a flow meter, and the height of the piston in the tube will indicate the rate of flow of the fuel. The operation of this part of the present invention is similar to the flow meter described in my prior application, Serial No. 334,465, filed October 30, 1919.

The laterally extending pointer 6 carried by the pin 5 may be made to travel in the rear of a slot 32 in the dial 27, and the edge of the slot may be calibrated, as shown at 33, to indicate the flow of fluid in gallons per hour, or pounds per hour, or in any other desired units.

A diagonal slot 34 is provided in the dial 27 and the lower edge of the slot 34 passes through the position occupied by the center of the pivot 5 for the rod 7 when the piston 4 is in its lowermost position, that is, when the rate of flow of fluid is zero. The lower edge of the slot 34 at its upper end passes through the pivotal support of the rod 7 on the collar 10 at the time that the collar 10 is in its uppermost position, that is, when the speed of the vehicle is zero. It will be apparent therefore that when the vehicle is at rest and there is no flow of fluid the rod 7 will be arranged in alinement with the lower edge of the slot 34. When the vehicle is running the rod 7 will assume a position in which it will cross the line formed by the lower edge of the slot 34 in a manner similar to that shown in Fig. 1. The position at which the rod crosses the line will depend upon two factors, namely, the rate of flow of the fluid to the engine and the speed of the vehicle. These two factors are the same factors which enter into the consumption of fuel per mile, or the miles traveled by the vehicle per gallon of fuel consumed. The greater the speed of the vehicle for a given rate of flow of fluid the lower will be the point at which the rod crosses the line, and the greater will be the miles per gallon. Likewise an increase in the rate of flow of the liquid for a given speed will raise the point at which the rod crosses the line, showing a decrease in the miles per gallon. It is therefore apparent that the lower edge of slot 34 may be calibrated to read directly the miles per gallon at any particular instant, and the reading is taken according to the position that the rod 7 crosses the calibrated scale. With an instrument of this kind the operator can tell at a glance not only the speed of his vehicle and the rate of consumption of fuel, but also the actual miles per gallon that is being secured without the necessity of computation or examination of calibration charts.

It is apparent that an odometer may also be connected with the instrument and driven by a gear 35 secured to the shaft 16. The odometer may be arranged so that its reading will appear as shown at 36 on the dial of the instrument. All of the moving parts are arranged within the casing and it is therefore not necessary to provide packing for connection with outside indicators. This prevents a drag upon the instrument due to friction of packed joints and secures accurate operation. A vent plug 37 is provided at the top of the instrument to permit escape of air when the casing is first filled with liquid. After the casing has been thus filled the vent is closed.

I claim:—

1. In combination, speedometer mechanism having indicating means for showing the speed of a motor, flow meter mechanism comprising a member positioned by differential pressure incident to the flow of fluid for indicating the rate of flow of fuel to said motor, and means connected to said speedometer indicating mechanism and said flow meter member for indicating at any particular time the speed of said motor per unit fuel consumed.

2. In a motor vehicle, a flow meter having a member actuated by differential pressure incident to the rate of flow of fluid to assume different positions, a speedometer having a device for assuming different positions according to the speed of said vehicle, and means connecting said flow meter member and said speedometer device to register distance per unit of motor fuel consumed.

3. In a motor vehicle, a flow meter comprising a standpipe, a movable member therein, a link pivoted at its one end to said movable member, a speedometer having its indicating arm pivoted at one end to the casing and its other end having a pivot common with the other end of the flow meter link, and a scale whereupon the resultant movement of said link may be registered.

In testimoy whereof I have signed my name to this specification on this 12th day of February, A. D. 1921.

RUDOLPH W. SCHROEDER.